United States Patent [19]
Cho

[11] Patent Number: 5,250,177
[45] Date of Patent: Oct. 5, 1993

[54] WATER PURIFIER WITH AN OZONE GENERATING DEVICE

[75] Inventor: Hong K. Cho, Suweon, Rep. of Korea

[73] Assignee: Samsung Electronics Co., Ltd., Suweon, Rep. of Korea

[21] Appl. No.: 726,184

[22] Filed: Jul. 5, 1991

[30] Foreign Application Priority Data

Jul. 9, 1990 [KR] Rep. of Korea .............. 90-10034[U]

[51] Int. Cl.$^5$ .......................................... C02F 1/78
[52] U.S. Cl. ..................... 210/192; 210/205; 204/286; 204/297 R; 422/186.07; 422/186.1
[58] Field of Search ............ 210/192, 198.1, 199, 210/205, 243, 748, 760; 422/186.07, 186.1, 186.18; 261/DIG. 42; 204/149, 176, 280, 286, 297 R

[56] References Cited

U.S. PATENT DOCUMENTS

| | | | |
|---|---|---|---|
| 799,605 | 9/1905 | Lester | 210/192 |
| 1,063,167 | 5/1913 | Smith et al. | 422/186.18 |
| 2,812,861 | 11/1957 | Bickford | 210/192 |
| 2,830,945 | 4/1958 | Keidel | 204/430 |
| 3,549,528 | 2/1969 | Armstrong | 210/192 |
| 3,784,008 | 1/1974 | Troglione | 210/192 |
| 3,865,733 | 2/1975 | Taylor | 422/186.07 |
| 4,090,960 | 5/1978 | Cooper | 210/192 |
| 4,176,061 | 11/1979 | Stopka | 210/192 |
| 4,375,395 | 3/1983 | Foller et al. | 204/129 |
| 4,414,092 | 11/1983 | Lu et al. | 204/129 |
| 4,416,747 | 11/1983 | Menth et al. | 204/129 |
| 4,427,426 | 1/1984 | Johnson et al. | 210/192 |
| 4,619,763 | 10/1986 | O'Brien | 210/192 |
| 4,728,441 | 3/1988 | King | 210/760 |
| 4,759,849 | 7/1988 | Baumann et al. | 210/195.2 |
| 4,798,669 | 1/1989 | Bachhoefer et al. | 210/192 |
| 4,836,929 | 6/1989 | Baumann et al. | 210/760 |
| 4,857,204 | 8/1989 | Joklik | 210/760 |
| 4,906,358 | 3/1990 | Sasaki et al. | 210/192 |
| 5,094,734 | 3/1992 | Torrado | 210/760 |

FOREIGN PATENT DOCUMENTS

149298  6/1988  Japan.

Primary Examiner—Peter Hruskoci
Assistant Examiner—Robert James Popovics
Attorney, Agent, or Firm—Burns, Doane, Swecker & Mathis

[57] ABSTRACT

A water purifier includes an ozone generator and a filter. Water is passed through the ozone generator wherein ozone is produced by electrolysis to sterilize the water. The sterilized water can be drawn-off after being sterilized, or can be conducted through the filter and then drawn-off. The water exiting the ozone generator can be conducted through a convoluted mixing conduit to mix the water and ozone. The ozone generator includes a cylindrical bobbin having positive and negative electrodes wound alternatingly around its outer surface. The electrodes pass across water channels formed in the bobbin outer surface. Water is passed through the channels whereby ozone is formed by electrolysis.

7 Claims, 4 Drawing Sheets

WATER PURIFIER WITH AN OZONE GENERATING DEVICE

BACKGROUND OF THE INVENTION

1. Field of the Invention

The present invention relates to a water purifier for sterilizing and filtering potable city water flowing out of a tap or faucet, and more particularly to a water purifier provided with an ozone generating device for sterilizing the water, and a water purifying filter for removing impurities and odor from the water.

2. Description of the Prior Art

Conventionally, known water purifiers will be classified into various types. Among the types of water purifiers are the gravity flow type of purifier and the pressurized type of purifier which is connected directly to a pressurized feed line.

The natural flow type of water purifier generally comprises an upper container provided with a water purifying filter and a lower container for storing the filtered water. The upper container is manually supplied with water. The water supplied into the upper container flows to the lower container by way of the water purifying filter by which the water is naturally filtered of impurities and odor. Thereafter, the filtered water is stored in the lower container for use as needed.

On the other hand, the pressurized type of water purifier, which is directly connected to the tap, can purify city water by means of a water purifying filter and directly supply the purified water under pressure through an outlet port such as a facet.

The above-mentioned known water purifiers each only filters the water of the impurities and odor by means of a water purifying filter such as activated carbon.

On the other hand, there is another type of water purifier which provides ozone for the city water in order to sterilize it.

One such water purifier is disclosed in U.S. Pat. No. 4,427,426 published on Jan. 24, 1984 and entitled "Ozonizer System". The water purifier disclosed in the U.S. patent comprises at least one, preferably two or more, ozone generating units each having an inner, rod-like electrode and an outer tubular electrode and a glass tube carrying the outer electrode, and end plates formed with sockets. Each inner electrode is seated in a pair of sockets with its ends abutting the closed ends of the sockets and clamped thereto by screws. The glass tube has its ends abutting shoulders in the sockets. There is provided a drier adapted for drying the air to be ozonized.

In operation of this type of water purifier, hot air is periodically passed through the drier to dry the desiccant material, and ambient air is drawn through the drier by a Venturi device which also serves to mix ozonized air with the water to be purified, thereby providing ozonized and purified water. However, this type of system has disadvantages in that it is a relatively complicated structure requiring many elements, and the periodical supplying of hot air. In addition, Japanese Utility Model Laid-Open Publication No. Sho. 63-149,298 published on Sep. 30, 1988 and entitled "A City Water Purifying Apparatus" disclosed another type of water purifier. This type of water purifier comprises an ozone generating device including a tap for draining out city water therethrough, a water-jet pump mounted to the tap and actuated by the pressure of the city water, an air inlet port, an ozone outlet port and a high voltage power generator; a conduit adapted for connecting the ozone outlet port of the ozone generating device to the water-jet pump, and a water flow sensor adapted for sensing the water flow at said tap in order to actuate the ozone generating device when it senses water flow. However, this type of water purifier has the disadvantage that the generated ozone only contacts the water for a relatively short time so that there is little time to efficiently ozonize the water. Furthermore, this water purifier can not sufficiently filter the city water of impurities and odor.

SUMMARY OF THE INVENTION

It is, therefore, an object of the present invention to provide a water purifier capable of solving the above-mentioned problems encountered in known water purifiers.

It is another object of the present invention to provide a water purifier provided which can be directly connected to a water tap and which has an ozone generating device, and a convoluted flow generating device adapted to sufficiently circulate the water in order to increase the solubility and contact time of the ozone with the water.

It is still another object of the present invention to provide a water purifier comprising water outlet ports, preferably two such ports, with one of the water outlet ports adapted to provide ozonized water without filtration and the other port adapted to provide ozonized and filter potable drinking water which passed through the ozone generating device, and the convoluted flow generating device so as to be ozonized, and then through the filter in order to sufficiently filtered of the impurities and odor.

The above-mentioned objects of the present invention can be accomplished by providing a water purifier comprising: means for generating ozone, said means for detachably connecting the present water filter to a tap by means of a water supply port thereof and adapted to change the supplied water into ozonized water; means for enabling an increased contact time between the ozone dissolved in the water and the water in order to sterilize the water and remove odors from the ozone treated water; means for supplying only the ozonized water with the means mounted at an end portion of the round-about flow allowing means for supplying ozone treated and unfiltered water; and means for generating ozone treated and filtered water, said means filtering said ozonized water passing through said branching means in order to provide potable drinking water.

The ozone generating means is mounted at an optimal portion in upper corner of the box-shaped main body and comprises an inner case provided with a plug and a joint socket each having the same inner diameter as that of a water supply pipe and adapted for detachably mounting the ozone generating means to the water supply pipe. An outer case is provided with a plug and a joint socket each adapted for connecting said ozone generating means to said round-about flow allowing means. A cylinder is provided inside said inner case and is spaced apart from said inner case. A bobbin is positioned inside said cylinder and is spaced apart from said cylinder to provide cylindrical space therebetween to provide a water passage. The bobbin includes a plurality of vertically extending ribs with each rib provided with a plurality of setting slots, comprising shallow and deep setting slots, said shallow and deep setting slots alternately and circumferentially formed and spaced apart from one another so as to repeatedly provide two types of pitches. An electrode wire having different polarity from each other are positioned into alternative slots. A space is provided between said vertical ribs, wherein said input city water is first contacted with ozone and changed into ozonized water.

The round-about or winding flow pattern means comprises a round flow pipe having a plurality of U-shaped bends. A plurality of supports are used for supporting said round flow pipe.

The water purifier having the above-mentioned structure can provide water having improved ozonization by allowing ozonized water having been first contacted with ozone and thus having been sterilized and deodorized in said ozone generating means to reside in said round-about flow means for a long time, and also provide potable drinking water by allowing said ozonized water to flow in said purified water generating means in order to remove bacterium and pathogens and also odor herefrom.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
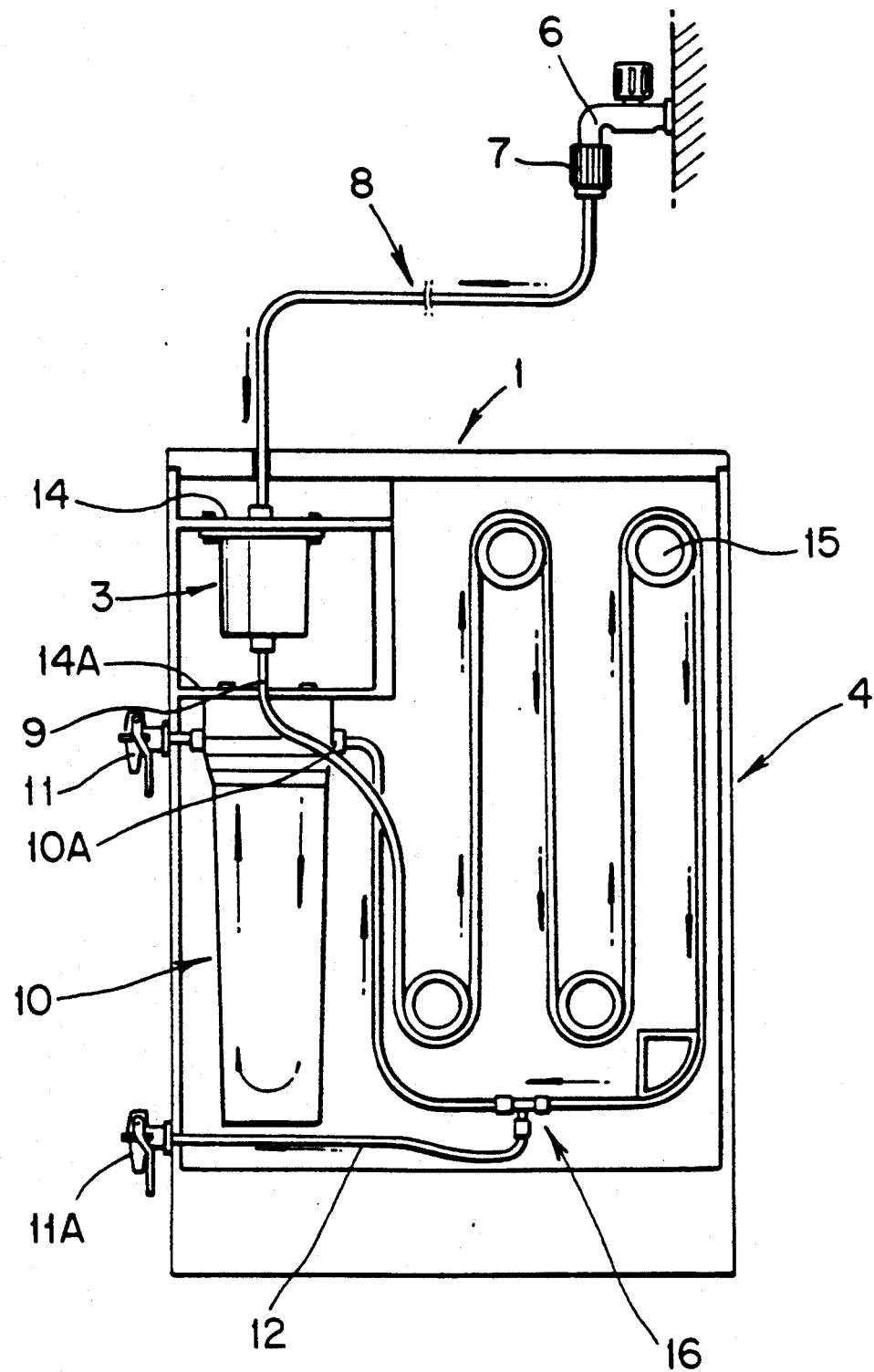
FIG. 1 is a schematic view showing the structure of a tap connection type of water purifier with an ozone generating device in accordance with the present invention.

Referring now to FIG. 1, the water purifier 1 is connected to the pressurized water supply by a water supply pipe 8. The water supply pipe 8 may be detachably connected a tap 6 by means of a clamp 7.

The water purifier according to the present invention comprises a main body 4 having the box shape. The main body includes a mounting bracket 14 for mounting the ozone generating device 3 thereto. The ozone generating device 3 is connected to the water supply pipe 8 at the top as illustrated.

A round-about or convoluted flow pipe 9 extends downward from the lower portion of the ozone generating device 3 and in turn curves around the bends of a plurality of annular supports 15, thereby forming a wave shape. The round-about flow pipe 9 also extends, after passing by the right side wall and lower corner of the main body 4, to a T-shaped branch pipe 16 from which a water outlet pipe 12 branches off from the main stream pipe. The main stream pipe then continues upward in order to connect with a water inlet port 10A of a water purifying filter 10 which is mounted under a lower mounting bracket 14A of the main body 4.

The water purifying filter 10 includes activated carbon as the filtering medium. A sediment filter and/or ion exchange medium may also be present in filter 10.

Water is filtered of injurious and poisonous heavy metals and the other materials by passing through the water purifying filter 10 to obtain potable drinking water through a drinking water outlet valve port 11 provided at a outlet port of the water purifying filter 10. In addition, there is a water outlet valve port 11A, provided at an outlet end of the water pipe 12, for supplying ozone treated water. The ozone treated water has been treated with ozone to kill pathogens.

Figure 2:
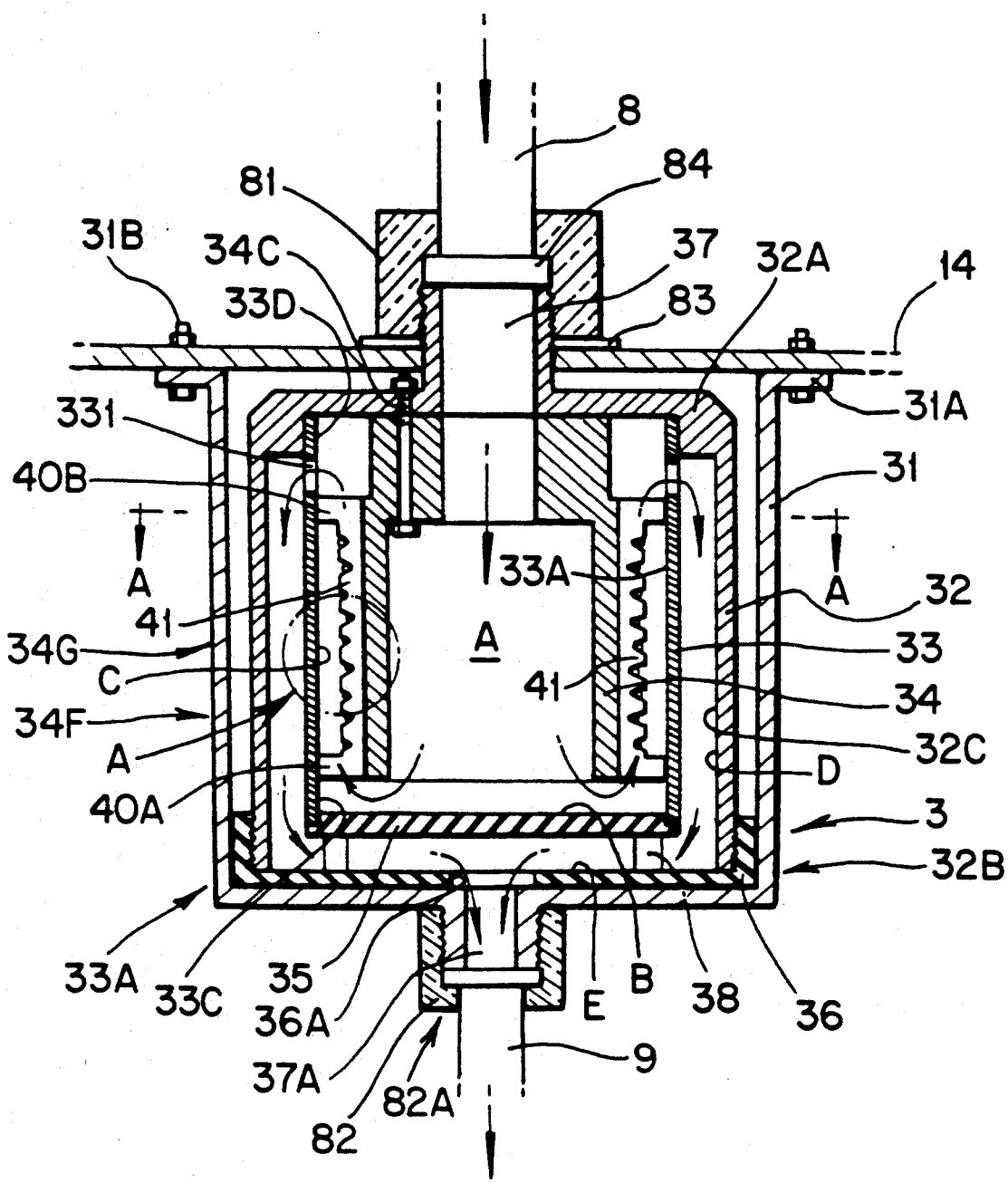
FIG. 2 is an enlarged section view of the ozone generating device of the water purifier of FIG. 1 taken along line 2—2 of FIG. 4.
Figure 3:
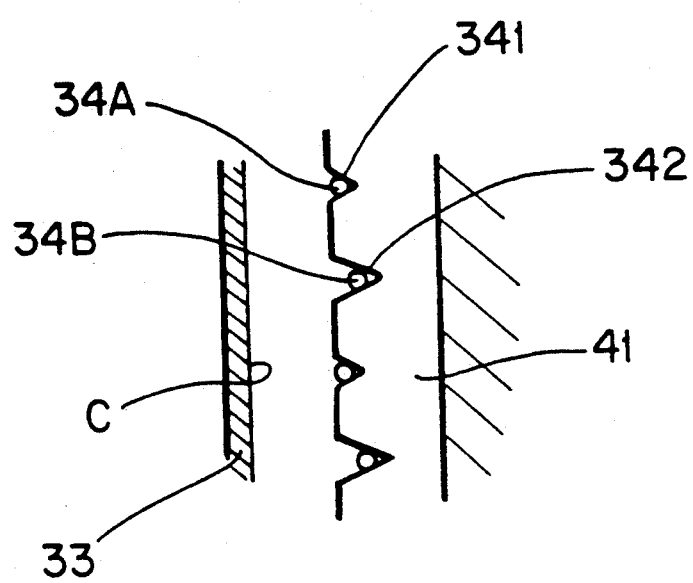
FIG. 3 is an enlarged section view of the "A" portion of FIG. 2.
Figure 4:
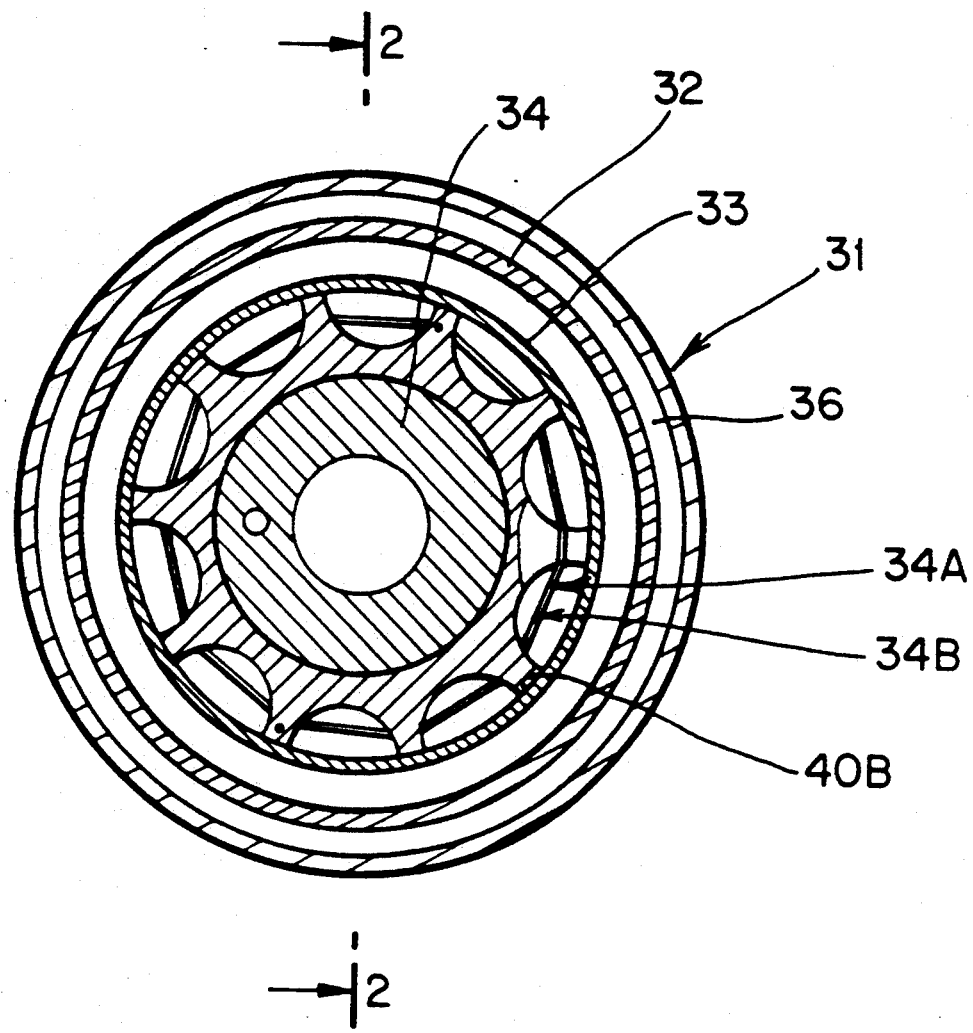
FIG. 4 is a cross-section view of the ozone generating device taken along the line A—A of FIG. 2.

Turning next to FIGS. 2 to 4, FIG. 2 is an enlarged sectional view of the ozone generating device of the water purifier of FIG. 1. FIG. 3 is an enlarged sectional view of the "A" portion of FIG. 2. FIG. 4 is a cross-section view of the ozone generating device taken along the line A—A of FIG. 2. The ozone generating device 3 includes a cylindrical outer case 31 having a plurality of upper lugs 31A each provided with a locking hole, and mounted to the upper mounting bracket 14 by means of each locking bolt and nut 31B fixed through each said locking hole. The ozone generating device further includes an inner case 32 having an outer diameter smaller than the inner diameter of the outer case 31 in order to be concentrically contained inside the outer case 31. A water inlet port 37 is integrally formed with screw plug at the top center. The water inlet port 37 includes an external thread and has the same inner diameter as that of the water supply pipe 8. The water inlet port 37 is tightly connected to the lower end of the water supply pipe 8 by means of a partially tapped joint socket 81 engaging the external threads, Gaskets 83 and 84 aid in sealing socket 81.

The inner case 32 has the cylindrical shape with the lower end 32B of the inner case 32 supporting a cylinder 33 by supports 38. Cylinder 33 has a diameter less than the diameter of the inner case 32 to enable the cylinder 33 to fit into the inner case 32 such that cylinder 33 is spaced apart from inner case 32. That is, a space is provided between the outer surface 33A of the cylinder 33 and the inner surface 32c of the inner case.

The length of the cylinder 33 is less than the length of the inner case 32 to enable cylinder 33 to be completely received into the inner case and to permit water to flow in the space between the lower end A of the cylinder 33 and the lower portion 32B of the inner case 32, as illustrated at FIG. 2.

The diameter of the cylinder 33 is greater than the diameter of a bobbin 34, described below, to enable the bobbin 34 to be received into the cylinder 33. The bobbin 34 is mounted to the top portion of the inner case 32 by means of a bolt and nut 34C. A circular sealing plate 35 seals the opening 33C at the lower end 33A of the cylinder 33.

The length of the bobbin 34 is less than the length of the cylinder 33 to enable bobbin 34 to be completely received into the cylinder 33 and to permit water to flow in a gap between the bottom of the bobbin 34 and the circular sealing plate 35 at the lower end 33A of the cylinder 33, as illustrated at FIG. 2.

The lower end 32B of the inner case 32 is provided with external threads which are threadably engaged by the internal threads of the circular cover 36 to seal cover 36 against the lower end 32B of the inner case 32. The circular cover further includes a center opening 36A formed therein. As illustrated at FIG. 2, spacing supports 38 are positioned between the circular sealing plate 35 and the cover 36 to support circular sealing plate 35 and to permit water flow to the center opening 36A. The opening 36A formed in the cover 36 enables water flow to the outlet port 37A connected to round flow pipe 9.

The concentric relationships of the outer case 31, inner case 32, cylinder 33, plurality of upper projections 40B and bobbin 34 are illustrated at FIG. 4.

The water outlet port 37A is integrally formed with the bottom of the outer case 31 and hads a plug-like shape having an outer threaded portion and the same inner diameter as that of the round flow pipe 9. A joint socket 82 is used with an inner threaded portion 82A to tightly connect the water outlet port 37A to an end of the round flow pipe 9 by engaging said inner threaded portion thereof with the outer threaded portion of the water outlet port 37A.

The bobbin 34 is provided with a plurality of lower and upper projections 40A and 40B with each projection extending outwardly from the upper 34F and lower 34G peripheries of the bobbin, respectively, and being spaced apart from one another. Each projection 40A, 40B tightly contacts the inner surface of the cylinder 33. The bobbin 34 further includes a plurality of vertical ribs 41 with a rib vertically extending between lower and upper projections 40A and 40B. The ribs form vertical water channels between one another.

Referring next to FIG. 3 which is an enlarged section view of the encircled portion of the bobbin 34 of FIG. 2, each vertical rib 41 of the bobbin 34 has two types of setting slots each formed as depressions on the outer surface of each rib 41. The slots consist of shallow setting slots 341 and deep setting slots 342. The shallow and deep setting slots 341 and 342 are alternately and circumferentially formed and spaced apart from on another so as to repeatedly provide two types of pitches. In one type of the slots a positive electrode wire 34A is wound and in the other type of slots the negative electrode wire is wound.

For purposes of illustration, the positive wire is positioned in the shallow slots 341 and the negative wire is positioned in the deep slot 342. That is, the positive wire could be placed in the deep slot and the negative wire in the shallow slot.

In operation of the water purifier in accordance with this invention, city water is supplied through the water inlet port 37, as represented at each arrow in FIGS. 1 and 2. The water flows downwardly into the cylindrical space A provided inside the bobbin 34, and then through a passage B provided by spacing apart of the lower end of said bobbin 34 and the sealing plate 35. The water then flows upwardly into a flow passage C, provided by the spacing apart of the vertical ribs 41 of the bobbin 34 and the cylinder 33, wherein the city water dissolves ozone to produce ozonized water. The ozone is generated by electrolysis of water between the positive and negative loop-shaped electrode wires 34A and 34B. Thereafter, the ozonized water flows through a plurality of passage holes 331 formed in the upper side wall 33D of the cylinder 33. The ozonized water then flows downwardly into the annular space D provided between the cylinder 33 and the inner case 32, and in turn flows into a space E provided between the cover 36 of the inner case 32 and the sealing plate 35, for sealing the lower end of said cylinder 33 and then to the opening 36A of cover 36. The ozonized water then flows into the water outlet port 37A of the outer case 31. The ozonized water, thereafter, enters the round flow pipe 9 by way of the water outlet port 37A in order to circulate through the round flow pipe 9.

The known ozonization of water by the electrolysis of water in the ozone generating device 3 will occur as follows:

$$H_2O \rightarrow O + H_2 \qquad (1)$$

$$2H_2O \rightarrow O_2 + 2H_2 \qquad (2)$$

If the above chemical formulas 1 and 2 are combined with each other, the following formula 3 can be obtained:

$$3H_2O \rightarrow O_3 + 3H_2 \qquad (3)$$

Therefore, ozone ($O_3$) is generated by the electrolysis of water, and the ozone is dissolved into the water. The quantity of ozone generated is directly proportional to the current intensity flowing between the positive and negative electrode wires 34A and 34B of the bobbin 34. The ozonized water is not exposed to air during circulating through the round flow pipe 9 so that the concentration of ozone does not change. Also, the longer the flow pipe 9 is, the longer the residence time of the ozone to react with the impurities in the water thereby improving the sterilizing power and providing efficient water purification.

The round flow pipe may be coiled, U-shaped or W-shaped in order to provide extended length in a small space, as illustrated at FIG. 1.

Also, there may be provided a drain device at a portion of the round flow pipe 9, curving around the bends of the lower disposed annular supports 15, and adapted for draining the impurities inside the ozonized water.

The ozonized water is sterilized and odors are removed during flowing in the round flow pipe 9 as described above, and then branches off at the T-shaped pipe 16 in order to provide water for washing and bathing and the like.

The washing/bathing water does not need to subject to purification, thereby allowing the washing/bathing water to be obtained before entering the water purifying filter 10.

On the other hand, the ozonized water passing through the T-shaped pipe 16 continuously circulates through the water purifying filter 10 in order to filter off the injurious materials to the human health, thereby making it possible to provide potable drinking water, which drinking water will be completely harmless to the human health.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A water purifier comprising:
   an ozone generator for generating ozone, and
   conduit means for conducting wafer to be purified through said ozone generator wherein ozone is produced by electrolysis to sterilize the water, said ozone generator comprising:
   a cylinder having an interior surface forming a space, and a water entrance and exit communicating with said space,
   a bobbin disposed in said space, said bobbin defining a longitudinal axis and including a plurality of radially outwardly projecting ribs which extend generally parallel to said axis, said ribs being circumferentially spaced apart to define therebetween water channels which communicate with said entrance and exit, and electrically conductive wire means wound around said bobbin in contact with said ribs to form longitudinally alternating positively and negatively charged windings for generating ozone by electrolysis in water flowing through said water channels, said water channels projecting radially inwardly past said windings, said windings being spaced radially inwardly from said interior surface of said cylinder.

2. A water purifier according to claim 1 including a filter disposed downstream of said ozone generator and communicating therewith so that sterilized water is purified.

3. A water purifier according to claim 2 including a first outlet disposed between said ozone generator and said filter for discharging water sterilized in said ozone generator, and a second outlet disposed downstream of said filter for discharging water which has been both sterilized by ozone and filtered by said filter.

4. A water purifier according to claim 2 including a convoluted conduit interconnecting said ozone generator and said filter and forming a mixing section in which water and ozone are mixed.

5. A water purifier according to claim 1, wherein said bobbin is hollow for conducting water therethrough along said axis, said bobbin forming longitudinally spaced first and second open ends, said first end communicating with said water entrance, and said second end communicating with said water channels, the water flowing in one longitudinal direction through said bobbin and in an opposite longitudinal direction through said channels.

6. A water purifier according to claim 5 including a case encompassing said cylinder and being spaced radially outwardly therefrom for forming therewith a water path communicating with said water channels for receiving water which has flowed through said channels and for conducting the water in a longitudinal direction substantially parallel to water flowing through said bobbin, said water path communicating with said water exit.

7. A water purifier according to claim 1, wherein said ribs include radially outer surfaces having longitudinally spaced slots in which said windings are disposed.

* * * * *